United States Patent
Liu et al.

(10) Patent No.: US 8,416,657 B2
(45) Date of Patent: Apr. 9, 2013

(54) METHOD AND SYSTEM FOR MANAGING DATA FROM HOST TO OPTICAL DISC

(75) Inventors: Tun-Hsing Liu, Tao-Yuan Hsien (TW); Tzu-Wei Kuo, Hsinchu (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 606 days.

(21) Appl. No.: 12/204,782

(22) Filed: Sep. 4, 2008

(65) Prior Publication Data

US 2009/0141606 A1 Jun. 4, 2009

Related U.S. Application Data

(60) Provisional application No. 60/991,771, filed on Dec. 3, 2007.

(51) Int. Cl.
*G06F 12/02* (2006.01)
*G06F 13/14* (2006.01)
*G11B 20/10* (2006.01)

(52) U.S. Cl.
USPC .......... 369/47.12; 369/30.07; 369/30.09; 369/30.23; 369/30.05; 369/30.37

(58) Field of Classification Search .......... 369/174, 369/59.26, 30.23, 47.12, 47.27, 47.31–47.34, 369/47.47, 14, 15, 30.05, 30.07, 30.09, 30.15, 369/30.19, 30.2, 30.24, 30.29, 30.3, 30.36, 369/30.37

See application file for complete search history.

(56) References Cited

U.S. PATENT DOCUMENTS

| | | | |
|---|---|---|---|
| 5,408,654 A | 4/1995 | Barry | |
| 5,848,050 A * | 12/1998 | Nagasawa et al. | 369/275.4 |
| 6,798,599 B2 | 9/2004 | Dykes et al. | |
| 7,706,221 B2 * | 4/2010 | Ando et al. | 369/47.12 |
| 2001/0006211 A1 | 7/2001 | Choi | |
| 2002/0080691 A1 * | 6/2002 | Cho | 369/30.19 |
| 2004/0202073 A1 * | 10/2004 | Lai et al. | 369/47.33 |
| 2005/0105320 A1 | 5/2005 | Suh | |
| 2005/0162990 A1 * | 7/2005 | Murata | 369/30.23 |
| 2006/0067191 A1 | 3/2006 | Jin | |
| 2007/0002699 A1 | 1/2007 | Suh | |
| 2007/0028040 A1 * | 2/2007 | Sinclair | 711/113 |
| 2007/0164241 A1 | 7/2007 | Nakano | |
| 2007/0183272 A1 * | 8/2007 | Yamada | 369/30.04 |
| 2008/0013416 A1 | 1/2008 | Van Rompaey | |
| 2008/0151722 A1 | 6/2008 | Hara | |
| 2008/0198706 A1 * | 8/2008 | Wu et al. | 369/30.23 |
| 2008/0205229 A1 | 8/2008 | Li | |
| 2008/0285425 A1 | 11/2008 | Ichihara | |
| 2011/0128833 A1 | 6/2011 | Nishiyama | |

FOREIGN PATENT DOCUMENTS

| | | |
|---|---|---|
| CN | 1992046 A | 7/2007 |
| TW | 460832 | 10/2001 |
| TW | I238991 | 9/2005 |

* cited by examiner

*Primary Examiner* — Wayne Young
*Assistant Examiner* — Dionne Pendleton
(74) *Attorney, Agent, or Firm* — Winston Hsu; Scott Margo

(57) ABSTRACT

A method for managing data from a host to an optical disc includes: storing data into a write data queue (WDQ) when the data of sequential write commands from the host are write-address-discontinuous; and transferring specific data from the WDQ to a write buffer when an available memory space in the WDQ is lower than a first threshold value or an available memory space in the write buffer exceeds a second threshold value.

18 Claims, 9 Drawing Sheets

METHOD AND SYSTEM FOR MANAGING DATA FROM HOST TO OPTICAL DISC

CROSS REFERENCE TO RELATED APPLICATIONS

This application claims the priority of U.S. Provisional Application No. 60/991,771, filed Dec. 3, 2007, which is included herein by reference.

BACKGROUND OF THE INVENTION

The present invention relates to a method of data management, and more particularly, to a method and a system for managing data from a host to an optical disc.

In Microsoft Windows FAT32 file system, write commands are transmitted by a host to the DVD-RAM (Digital Versatile Disc Random Access Memory) disc with random LBA (Logic Block Address) sequence. In other words, data of sequential write commands from the host may be write-address-discontinuous. The "write-address-discontinuous" here means that two data written into the disc and their ECC LBA are discontinuous. Similarly, "write-address-continuous" means that two data written into the disc and their ECC LBA are continuous. For example, a first data is needed to be written into the disc at ECC LBA 00DA34-00DA53, and when a second data is needed to be written into the disc at an ECC LBA 00DA54-XXXXXX, the second data and the first data are write-address-continuous; otherwise the second data and the first data are write-address-discontinuous.

For an optical storage system having a single write buffer mechanism, when the data of sequential write commands from the host is write-address-continuous, these data are temporally stored into the write buffer, and when a size of the data stored in the write buffer satisfies a predetermined value, the stored data are written to the optical disc.

However, when the data of incoming write commands from the host is write-address-discontinuous with the data stored in the write buffer, the data stored in the write buffer needs to be written to the optical disc no matter whether the size of the data exceeds the predetermined value or not, and then the data of a next write command is stored into the write buffer.

Please refer to FIG. 1. FIG. 1 is a diagram illustrating sequential write commands whose data are write-address-discontinuous. As shown in FIG. 1, five write commands CMD1-CMD5 are sequentially transmitted from the host to the write buffer, where two adjacent write commands are write-address-discontinuous.

Furthermore, beginning write addresses of the data of write commands CMD1-CMD5 are not aligned with ECC blocks as showed in FIG. 2. FIG. 2 is a diagram illustrating the write commands and ECC blocks related to the ECC LBAs of the data of the write commands shown in FIG. 1. Referring to FIG. 1 and FIG. 2 together, in the operations of the data written to the optical disc, because the data of any two write commands are write-address-discontinuous, before the data of each write commands CMD2-CMD5 is stored into the write buffer, what is stored in the write buffer (data of write commands CMD1-CMD4) needs to be written into the optical disc, therefore, it needs to write data into the optical disc at least four times.

In addition, because the beginning write addresses of the data of write commands CMD1-CMD5 are not aligned with ECC blocks, when the data of each write command CMD2-CMD5 needs to be written into the optical disc, a tail of the previous write-address-continuous data needs to be read from the optical disc first. For example, when the data of write command CMD3 needs to be written into the optical disc, a tail (i.e., address 00DA50-00DA54) is read from the optical disc, and then, this tail and the data of the write command CMD3 are written into the optical disc. Therefore, in FIG. 1, it needs to read the tails of the previous write-address-continuous data from the optical disc five times.

As mentioned above, before writing CMD1-CMD5 into the optical disc, the data which has been written on the optical disc needs to be read out, and then written into the optical disc again. Therefore, the related art method of writing data into the optical disc is inefficient.

SUMMARY OF THE INVENTION

It is therefore an objective of the present invention to provide a method and a system for managing data from a host to an optical disc efficiently, in order to solve the above-mentioned problem.

According to one embodiment of the present invention, a method for managing data from a host to an optical disc comprises: storing data into a write data queue (WDQ) when the data of sequential write commands from the host are write-address-discontinuous; and transferring specific data from the WDQ to a write buffer when an available memory space in the WDQ is lower than a first threshold value or an available memory space in the write buffer exceeds a second threshold value.

An optical storage system according to the embodiment of the present invention comprises a write buffer, a processor and a decision unit. The decision unit is coupled to the processor and the write buffer, and is utilized for storing the data into a write data queue (WDQ) when data of sequential write commands from the host are write-address-discontinuous, and for transferring specific data from the WDQ to a write buffer when an available memory space in the WDQ is lower than a first threshold value or an available memory space in the write buffer exceeds a second threshold value.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

Figure 3:
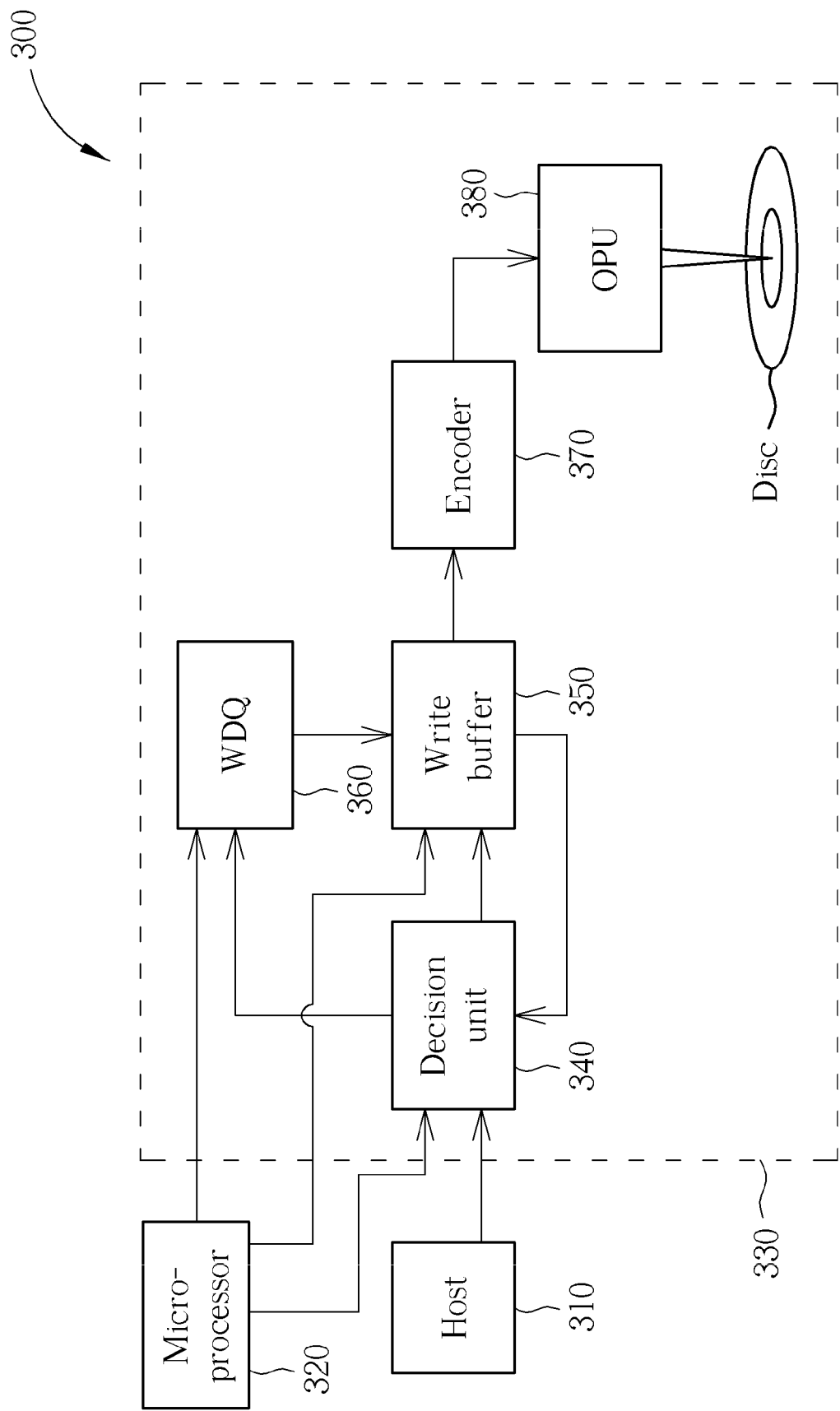
FIG. 3 is a diagram illustrating an optical storage system according to one embodiment of the present invention.

FIG. 3 is a diagram illustrating an optical storage system 300 according to one embodiment of the present invention. The optical storage system 300 includes a host 310, a microprocessor 320, and an optical disc drive 330, where the optical disc drive 330 includes a decision unit 340, a write buffer 350, a write data queue (WDQ) 360, an encoder 370 and an optical pick-up head 380, where the WDQ 360 is a storage device or a storage block.

In the optical storage system 300, the host 310 sequentially transmits write commands to the decision unit 340. Then, the decision unit 340 determines if data of the write command is write-address-continuous with the data stored in the write buffer 350. If the data of the incoming write command is write-address-continuous with the data stored in the write buffer 350, the decision unit 340 stores the data of the incoming write command to the write buffer 350; and if the data of the incoming write command is write-address-discontinuous with the data stored in the write buffer 350, the decision unit 340 stores the data of the incoming write command to the WDQ 360.

Then, when an available memory space in the WDQ 360 is lower than a threshold value or the write buffer 350 is empty, the decision unit 340 transfers the leading data stored in the WDQ 360 and its write-address-continuous data to the write buffer 350. After that, the data stored in the write buffer 350 are transmitted to the encoder 370 to output encoded data to the optical pick-up head 380. Thus, the optical pick-up head 380 writes the encoded data to an optical disc.

Figure 1:
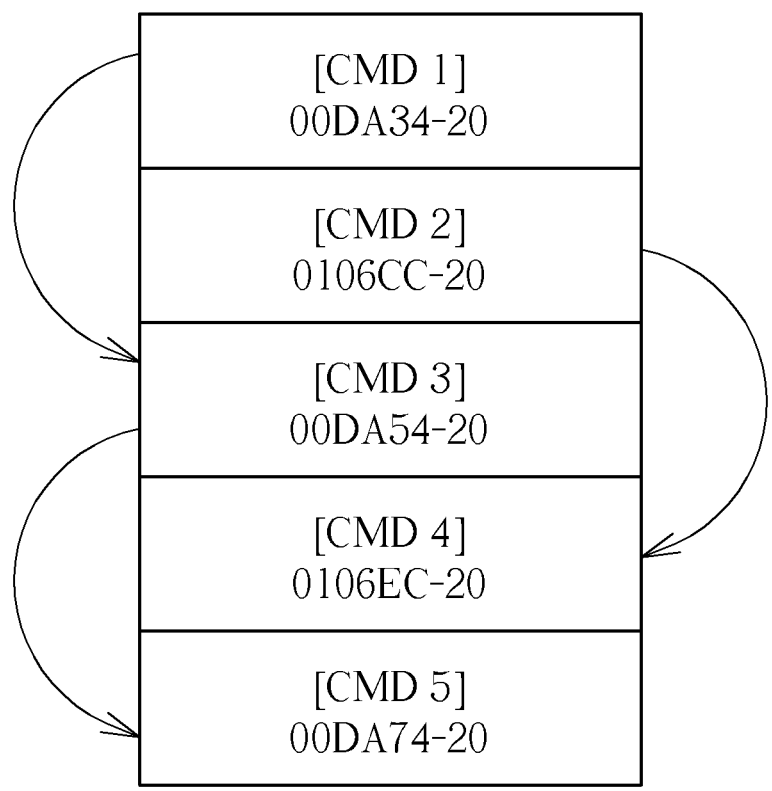
FIG. 1 is a diagram illustrating sequential write commands whose data are write-address-discontinuous.
Figure 2:
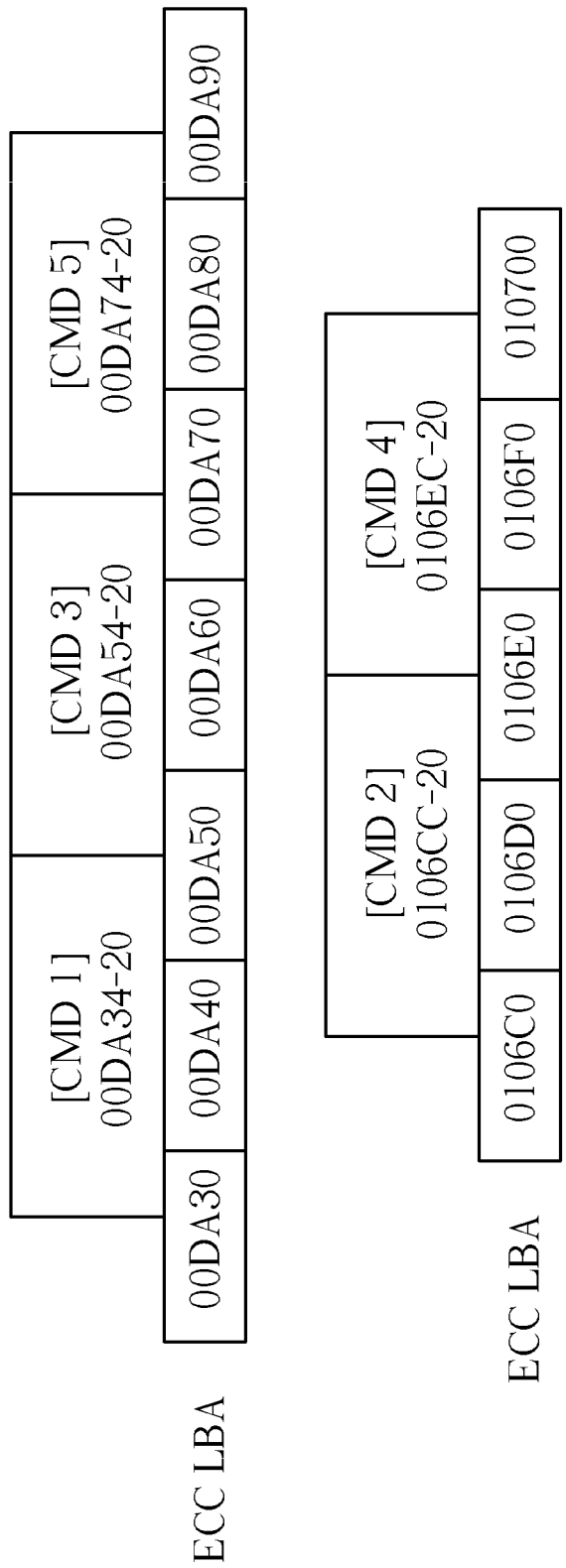
FIG. 2 is a diagram illustrating the write commands and ECC blocks related to the ECC LBAs of the data of the write commands shown in FIG. 1.

Taking the sequential write commands shown in FIG. 1 as an example, according to the optical storage system 300, the operations of the data written to the optical disc are as follows:

(a) Store the data of write command CMD1 into the write buffer 350, store the data of command CMD2 into the WDQ 360, store the data of write command CMD3 into the write buffer 350, store the data of write command CMD4 into the WDQ 360, store the data of write command CMD5 into the write buffer 350.

(b) Read a tail (i.e., address 00DA30-00DA34) of the previous write-address-continuous data from the optical disc, write the tail of the previous write-address-continuous data and the data of CMD1, CMD3, and CMD5 into the optical disc and verify the data, where the tail of the previous write-address-continuous data is defined as the previous write-address-continuous data in the ECC block at which a beginning address (LBA) of the current data (in this embodiment, the data of CMD1, CMD3, and CMD5) occurs.

(c) Transfer the data of write commands CMD2 and CMD4 from the WDQ 360 to the write buffer 350.

(d) Read a tail (i.e., address 0106C0-0106CC) of the previous write-address-continuous data from the optical disc, write the tail of the previous write-address-continuous data and the data of CMD2 and CMD4 into the optical disc and verify the data.

Compared with the prior art method of writing data into the optical disc, the optical storage system 300 only writes the data into the optical disc twice, and is therefore more efficient.

Figure 4:
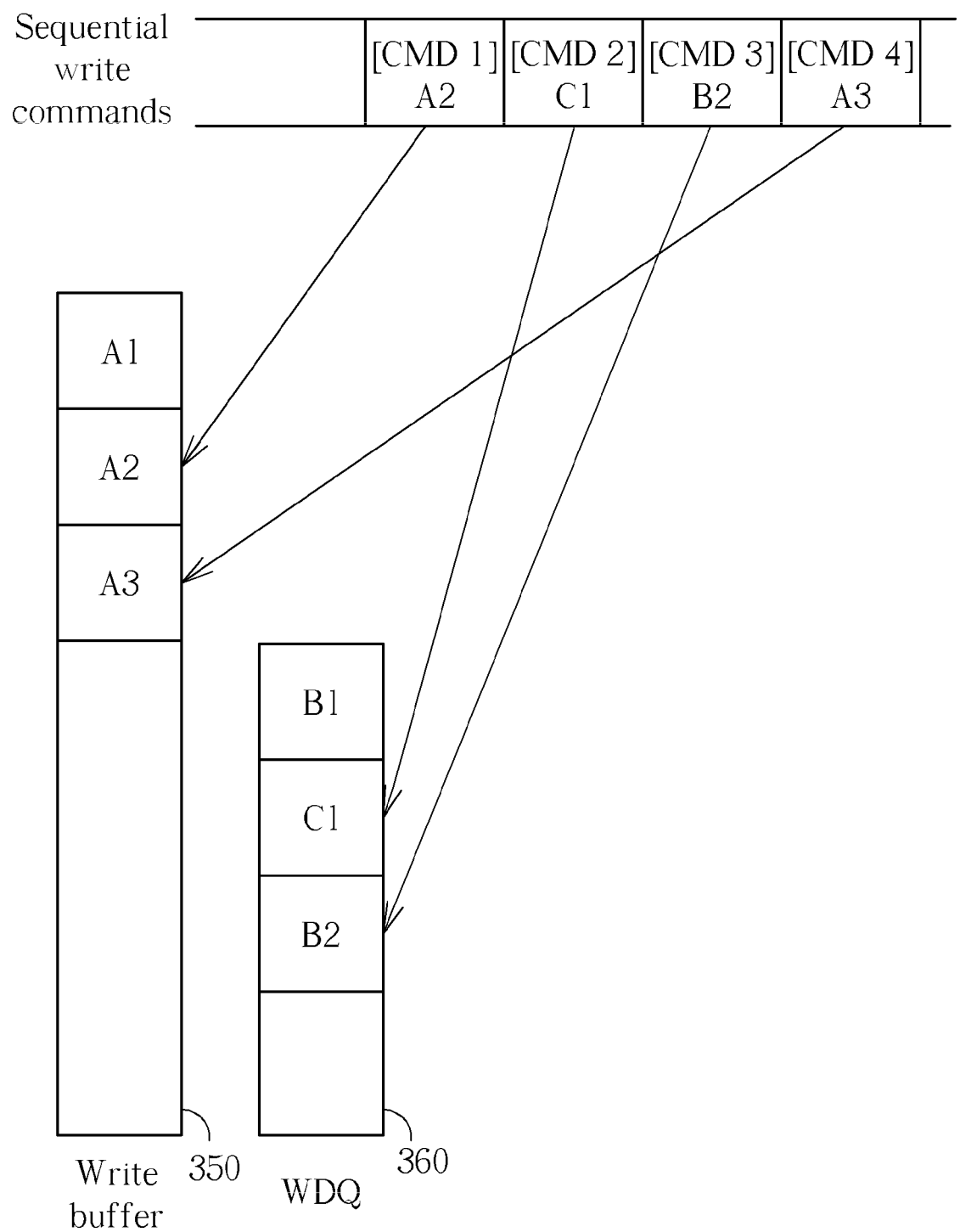
FIG. 4 is a diagram illustrating the detailed operations of the decision unit.

Please refer to FIG. 4. FIG. 4 is a diagram illustrating the detailed operations of the decision unit 340. In FIG. 4, the write buffer 350 initially includes data A1 and the WDQ 360 initially includes data B1, and the host 310 sequentially transmits four write commands CMD1-CMD4 respectively having data A2, C1, B2 and A3 to the decision unit 340. First, the data A2 of the write command CMD1 is stored into the write buffer 350 because the data A2 and A1 are write-address-continuous. Then, the data C1 of the write command CMD2 is stored into the WDQ 360 because the data C1 and A2 are write-address-discontinuous. Then, the data B2 of the write command CMD3 is stored into the WDQ 360 because the data B2 and A2 are write-address-discontinuous. Finally, the data A3 of the write command CMD4 is stored into the write buffer 360 because the data A3 and A2 are write-address-continuous.

Figure 5:
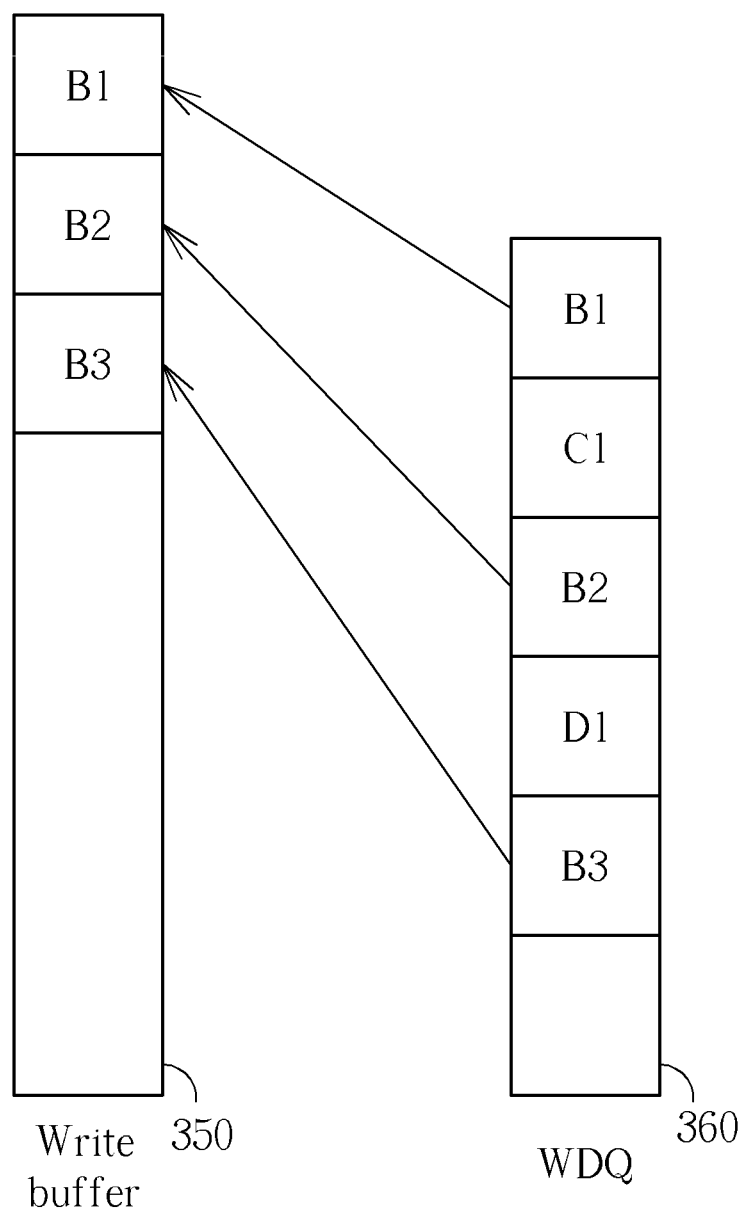
FIG. 5 is a diagram illustrating the detailed operations between the WDQ and the write buffer.

Please refer to FIG. 5. FIG. 5 is a diagram illustrating the detailed operations between the WDQ 360 and the write buffer 350. In FIG. 5, the data B1, C1, B2, D1 and B3 are sequentially stored into the WDQ 360, and when the available memory space in the WDQ 360 is lower than the threshold value or the write buffer 350 is empty, the leading data B1 and its write-address-continuous data B2 and B3 are transferred from the WDQ 360 to the write buffer 350.

In addition, in FIG. 5, after the data B1-B3 are transferred from the WDQ 360 to the write buffer 350, the micro-processor 320 controls the WDQ 360 to rearrange the remaining data C1 and D1 according to a sequence of the remaining data originally stored into the WDQ 360. For example, after rearranging the data C1 and D1, the data C1 becomes the leading data in the WDQ 360. Therefore, next time when the available memory space in the WDQ 360 is lower than the threshold value or the write buffer 350 is empty, the data C1 and its write-address-continuous data in the WDQ 360 are transferred to the write buffer 350.

In addition, the data of the write command in the WDQ 360 corresponds to a WDQ data structure WDQ_Info, and each WDQ data structure WDQ_Info includes a WDQ-Memory pointer bDramPtr, a stream pointer dStrmHdrAddr, a sequential number bQorder of the data stored in the WDQ 360, a link-up pointer bLinkUp, a link-down pointer bLinkDn, a data length bULen, and a write address of a next write-address-continuous data dNxAddr.

Figure 6:
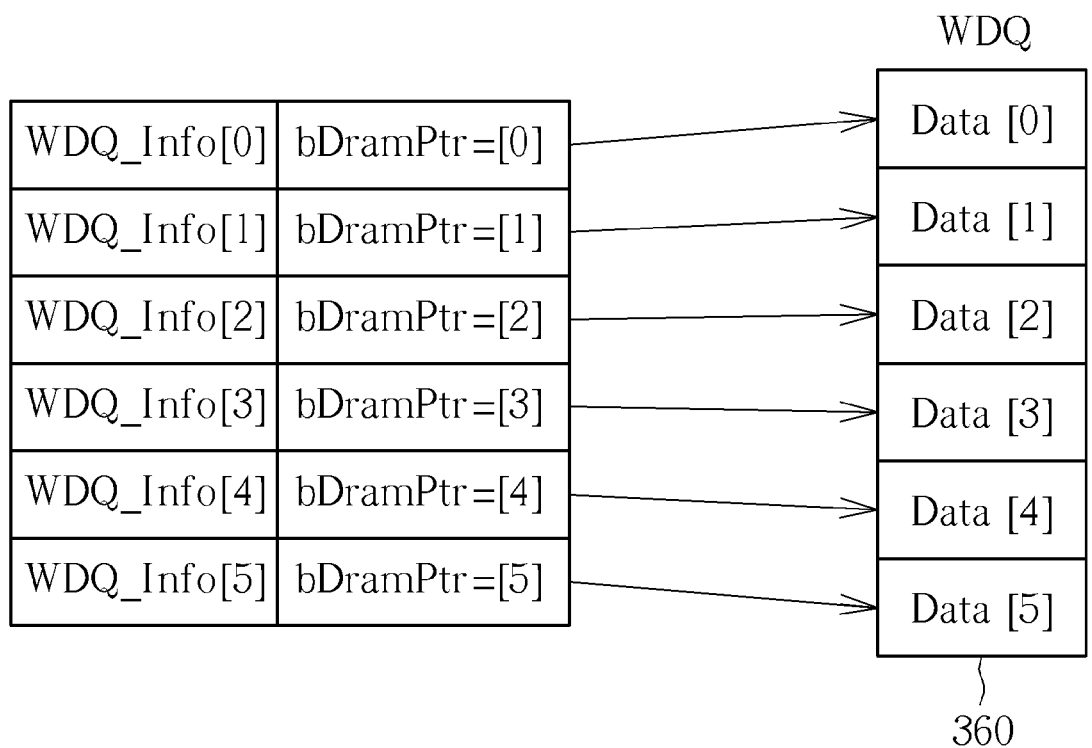
FIG. 6 is a diagram illustrating the WDQ data structure.
Figure 7:
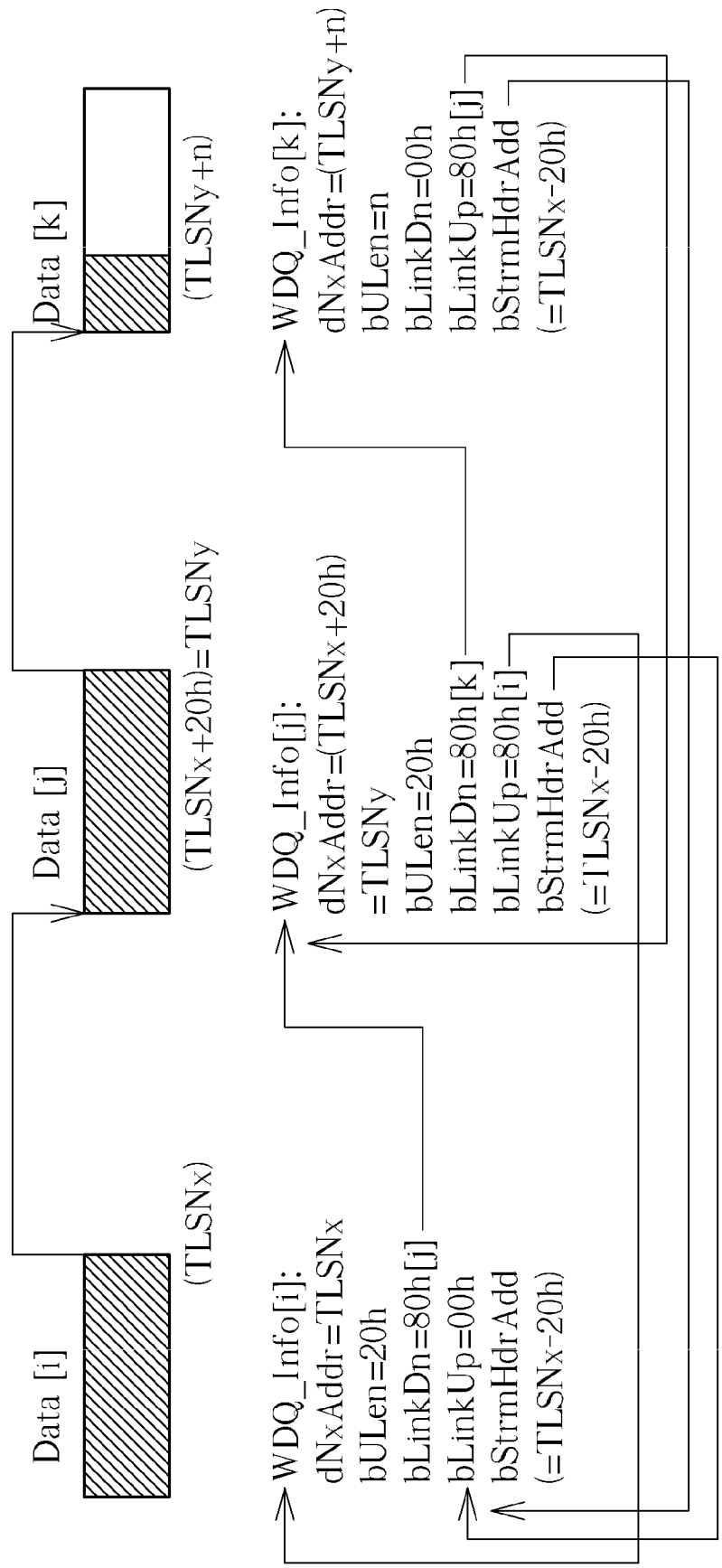
FIG. 7 is a diagram illustrating the WDQ data structure.

Please refer to FIG. 6 and FIG. 7. FIG. 6 and FIG. 7 are diagrams illustrating the WDQ data structure. In FIG. 6, there are six data, Data[0]-Data[5], in the WDQ 360, and the WDQ-Memory pointers bDramPtr of the WDQ data structures WDQ_Info[0]-WDQ_Info[5] respectively point to the data Data[0]-Data[5] in the WDQ 360. In addition, the index of the WDQ data structure is the sequential number bQorder of the data stored in the WDQ 360.

In FIG. 7, the Data[i], Data[j] and Data[k] are write-address-continuous data in the WDQ 360, and for each WDQ data structure (WDQ_Info[i], WDQ_Info[j] and WDQ_Info [k]), dNxAddr represents the write address of a next write-address-continuous data, bULen represents the length of the corresponding data, the link-down pointer bLinkDn is used for pointing to a next write-address-continuous data in the WDQ 360, the link-up pointer bLinkUp is used for pointing to a previous write-address-continuous data in the WDQ 360, and the stream pointer dStrmHdrAddr is used for pointing to a beginning address of the WDQ 360.

In practice, the host 310 shown in FIG. 3 can be an application program or a driver, and the decision unit 340 can be implemented by firmware to determine if data of the write command is write-address-continuous with the data stored in the write buffer 350.

In addition, the WDQ 360 and the write buffer 350 can be integrated as a single memory, wherein sizes of the WDQ 360 and the write buffer 350 can be determined according to the designer's consideration.

However, for an optical disc drive having a fixed memory size, applying the WDQ of the present invention enables the size of the write buffer to be decreased (originally all the memory can be used as the write buffer); that is, the amount of data from the write buffer written to the optical disc is also decreased. Therefore, the above-mentioned method for managing the data from the host is more efficient when the incoming data from the host are write-address-discontinuous. However, when the incoming data are write-address-continuous over a long period, the incoming data are all stored into the write buffer, and the WDQ is idle. To solve this problem, the present invention further provides a method for efficiently managing data when the incoming data are write-address-continuous.

Figure 8:
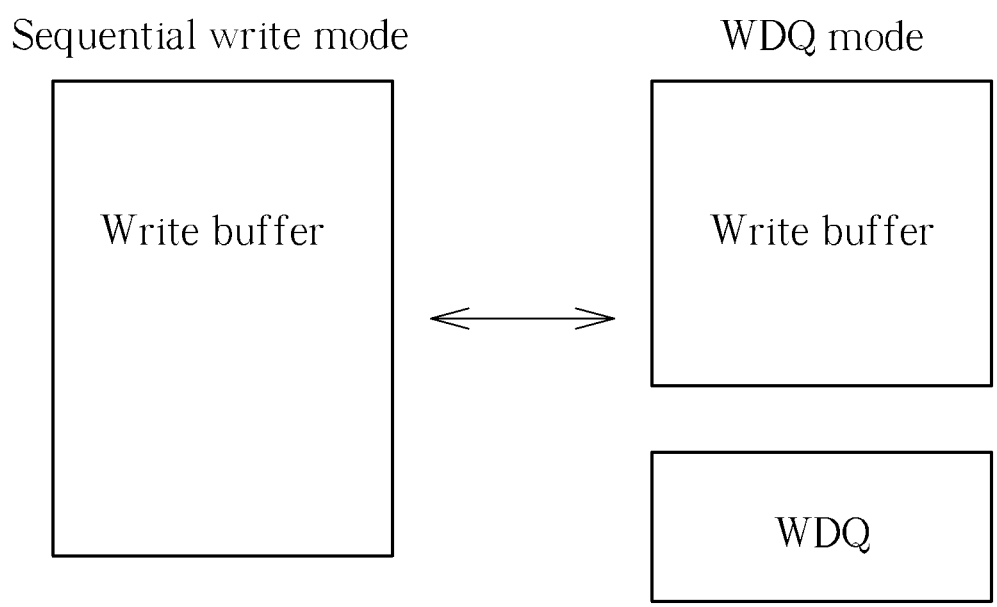
FIG. 8 is a diagram illustrating a WDQ mode and a sequential write mode.

Please refer to FIG. 8. FIG. 8 is a diagram illustrating a WDQ mode and a sequential write mode. Refer to FIG. 3 as an example, the operations of the system in the WDQ mode is the same as the optical storage system 300, and when the WDQ 360 is in the sequential write mode, the WDQ 360 acts as an extension of the write buffer 350. In addition, the microprocessor switches the WDQ 360 between the WDQ mode and the sequential write mode according to divergence of the data of the sequential write commands.

Figure 9:
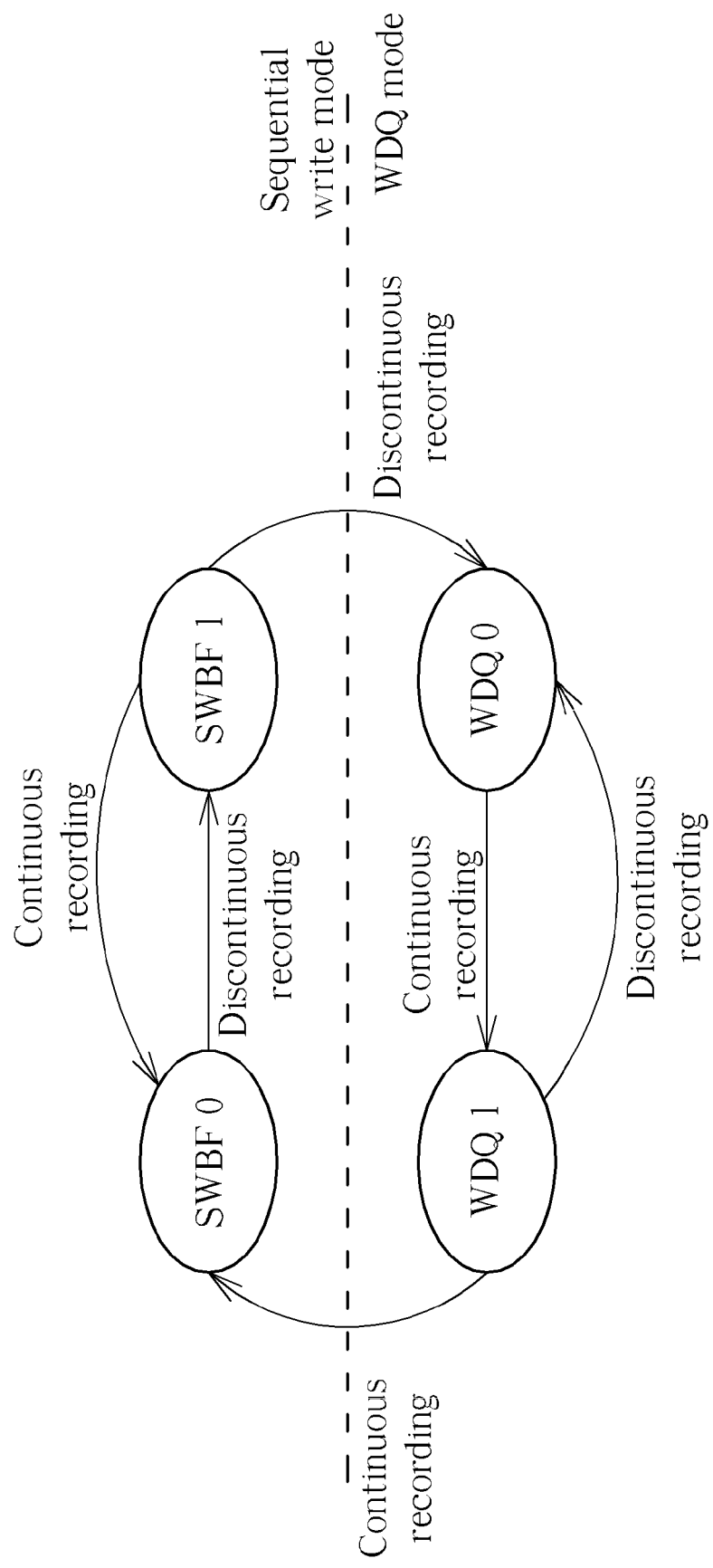
FIG. 9 is a diagram illustrating a switch state machine of the WDQ mode and the sequential write mode.

FIG. 9 is a diagram illustrating a switch state machine of the WDQ mode and the sequential write mode. As shown in FIG. 9, assuming that the WDQ 360 is initially at state SWBF0 in the sequential write mode, when an amount of write-address-discontinuous data during a predetermined period is greater than a predetermined value, the WDQ 360 is changed to be at state SWBF1. Then, if the following incoming data are write-address-continuous, the WDQ 360 goes back to state SWBF0 from state SWBF1; if the following incoming data are still write-address-discontinuous during a period, the WDQ 360 is switched to state WDQ0 of the WDQ mode from state SWBF1.

Similarly, assuming that the WDQ 360 is initially at state WDQ0 in the WDQ mode, when an amount of write-address-continuous data during a predetermined period is greater than a predetermined value, the WDQ 360 is changed to be at state WDQ1. Then, if the following incoming data are write-address-discontinuous, the WDQ 360 goes back to state WDQ0; if the following incoming data are still write-address-continuous during a period, the WDQ 360 is switched to the sequential write mode and is at state SWBF0.

It is noted that the above switch state machine shown in FIG. 9 is for illustrative purposes only. A number of states in the sequential write mode or the WDQ mode can be designed according to the designer's considerations. For example, an additional state WDQ2 can be added between the states WDQ1 and SWBF0.

In addition, transition conditions of the switch state machine described above are merely examples, and not limitations of the present invention. For example, the switch state machine can be designed so that the state WDQ0 is switched to the state WDQ1 under the condition that all data over the predetermined period are write-address-continuous data. For simplicity, as long as the WDQ is switched between the WDQ mode and the sequential write mode according to divergence of the data of the sequential write commands, these alternative designs all lie within the scope of the present invention.

Briefly summarized, the WDQ in the present invention is used to store the write-address-discontinuous data transmitted from the host, and when the available memory space in the WDQ is lower than the threshold value or the write buffer is empty, the leading data stored in the WDQ and its write-address-continuous data in the WDQ are transferred to the write buffer. According to the method of the present invention, a number of times of writing the data to the optical disc and a number of times of verifying the data on the optical disc can be decreased, and the recording time of the optical disc can thereby be reduced.

Those skilled in the art will readily observe that numerous modifications and alterations of the device and method may be made while retaining the teachings of the invention.

What is claimed is:

1. A method for managing data from a host to an optical disc, comprising:
   switching a write data queue (WDQ) between a WDQ mode and a sequential write mode according to divergence of data of sequential write commands, wherein when an amount of write-address-discontinuous data during a predetermined period is greater than a predetermined value, switching the WDQ from the sequential write mode to the WDQ mode;
   when the WDQ is in the WDQ mode:
      storing data into the WDQ when the data of sequential write commands from the host are write-address-discontinuous; and
      transferring specific data from the WDQ to a write buffer; and
      when the data of sequential write commands from the host are write-address-continuous, storing the data of sequential write commands into the write buffer without storing into the WDQ; and
   when the WDQ is in the sequential write mode:
      utilizing the WDQ to act as an extension of the write buffer, and storing the data of sequential write commands into the write buffer and the WDQ when the data of sequential write commands from the host are write-address-continuous.

2. The method of claim 1, wherein the step of switching the WDQ between the WDQ mode and the sequential write mode comprises:
   when all data during a predetermined period are write-address-continuous data, switching the WDQ from the WDQ mode to the sequential write mode.

3. The method of claim 1, wherein the step of transferring the data from the WDQ to the write buffer comprises:
   transferring a leading data and write-address-continuous data following the leading data from the WDQ to the write buffer.

4. The method of claim 3, wherein the step of transferring the data from the WDQ to the write buffer further comprises:
   rearranging remaining data in the WDQ according to a sequence of the remaining data originally stored into the WDQ.

5. The method of claim 1, wherein each data in the WDQ corresponds to a WDQ data structure, and the WDQ data structure comprises:
   a WDQ-Memory pointer, for pointing to corresponding data in the WDQ; and
   a stream pointer, for pointing to a beginning address of the WDQ.

6. The method of claim 5, wherein the WDQ data structure further comprises:
   a sequence number of the data stored in the WDQ;
   a link-up pointer, for pointing to a previous write-address-continuous data in the WDQ; and
   a link-down pointer, for pointing to a next write-address-continuous data in the WDQ.

7. The method of claim 6, wherein the WDQ data structure further comprises:
   a data length; and
   a write-address of a next write-address-continuous data.

8. The method of claim 1, wherein a WDQ size is determined according to divergence of the data of the sequential write commands.

9. The method of claim 1, wherein the step of transferring the specific data from the WDQ to the write buffer comprises
   transferring specific data from the WDQ to a write buffer when an available memory space in the WDQ is lower than a threshold value or the write buffer is empty.

10. An optical storage system, comprising:
    a write buffer;
    a micro-processor; and
    a decision unit, coupled to the micro-processor and the write buffer, for switching a write data queue (WDQ) between a WDQ mode and a sequential write mode according to divergence of data of the sequential write commands, wherein when an amount of write-address-discontinuous data during a predetermined period is greater than a predetermined value, the micro-processor switches the WDQ from the sequential write mode to the WDQ mode;
    wherein when the WDQ is in the WDQ mode, the decision unit stores data into the WDQ when the data of sequential write commands from the host are write-address-discontinuous, and transfers specific data from the WDQ to a write buffer; and when the data of sequential write commands from the host are write-address-continuous, the decision unit stores the data of sequential write commands into the write buffer without storing into the WDQ; and
    wherein when the WDQ is in the sequential write mode, the WDQ acts as an extension of the write buffer, and the decision unit stores the data of sequential write commands into the write buffer and the WDQ when the data of sequential write commands from the host are write-address-continuous.

11. The optical storage system of claim 10, wherein when all data during a predetermined period are write-address-continuous data, the micro-processor switches the WDQ from the WDQ mode to the sequential write mode.

12. The optical storage system of claim 10, wherein the micro-processor controls the write buffer to receive a leading data and write-address-continuous data following the leading data from the WDQ.

13. The optical storage system of claim 12, wherein the micro-processor controls the WDQ to rearrange remaining data in the WDQ according to a sequence of the remaining data originally stored into the WDQ.

14. The optical storage system of claim 10, wherein each data in the WDQ corresponds to a WDQ data structure, and the WDQ data structure comprises:
    a WDQ-Memory pointer, for pointing to corresponding data in the WDQ; and
    a stream pointer, for pointing to a beginning address of the WDQ.

15. The optical storage system of claim 14, wherein the WDQ data structure further comprises:
    a sequence number of the data stored in the WDQ;
    a link-up pointer, for pointing to a previous write-address-continuous data in the WDQ; and
    a link-down pointer, for pointing to a next write-address-continuous data in the WDQ.

16. The optical storage system of claim 15, wherein the WDQ data structure further comprises:
    a data length; and
    a write-address of a next write-address-continuous data.

17. The optical storage system of claim 10, wherein the micro-processor determines a WDQ size according to divergence of the data of the sequential write commands.

18. The optical storage system of claim 10, wherein the decision transfers the specific data from the WDQ to the write buffer when an available memory space in the WDQ is lower than a threshold value or the write buffer is empty.

* * * * *